United States Patent [19]
Conroy

[11] 3,773,420
[45] Nov. 20, 1973

[54] APPARATUS FOR MEASURING THE THICKNESS OF A METAL OXIDE COATING ON A GLASS ARTICLE

[75] Inventor: Gary D. Conroy, Lancaster, Ohio
[73] Assignee: Anchor Hocking Corporation, Lancaster, Ohio
[22] Filed: Feb. 28, 1972
[21] Appl. No.: 229,939

[52] U.S. Cl.............. 356/51, 313/108, 313/109, 356/161, 250/224
[51] Int. Cl................. G01n 21/34, G01b 7/06
[58] Field of Search.................. 313/108, 109; 250/43.5, 83.3 UV, 224; 356/51, 161

[56] References Cited
UNITED STATES PATENTS

| | | | |
|---|---|---|---|
| 2,355,258 | 8/1944 | Biggs et al. | 313/109 |
| 3,085,160 | 4/1963 | Dahms | 250/224 X |
| 3,185,024 | 5/1965 | McCreanor | 356/161 X |
| 3,395,278 | 7/1968 | McDivitt | 250/83.3 UV |

OTHER PUBLICATIONS
Nagata et al., Jap. J. of Applied Physics 6, (2) February 1967, pp. 251–257.
Ruiz–Urbibta et al., J. Optical Soc. of America, 61, (3), March 1971, pp. 351–359.

*Primary Examiner*—David Schonberg
*Assistant Examiner*—R. J. Webster
*Attorney*—James S. Hight et al.

[57] ABSTRACT

Apparatus for measuring the thickness of a metal oxide coating on the surface of a glass article, wherein the apparatus is provided with a measurement head which contains a light source (preferably of ultraviolet light) and a detector responsive to reflected light from the source. Both the source and the detector are maintained in a fixed close-spaced relationship with a measurement plane defined by the head and residing on the surface of the article to be measured. Adjustable mounting means are provided to secure the head to an article holding support so that different sizes of articles can be quickly and accurately measured, and so that coatings can be measured on various inclined surfaces of the articles.

12 Claims, 3 Drawing Figures

PATENTED NOV 20 1973 3,773,420
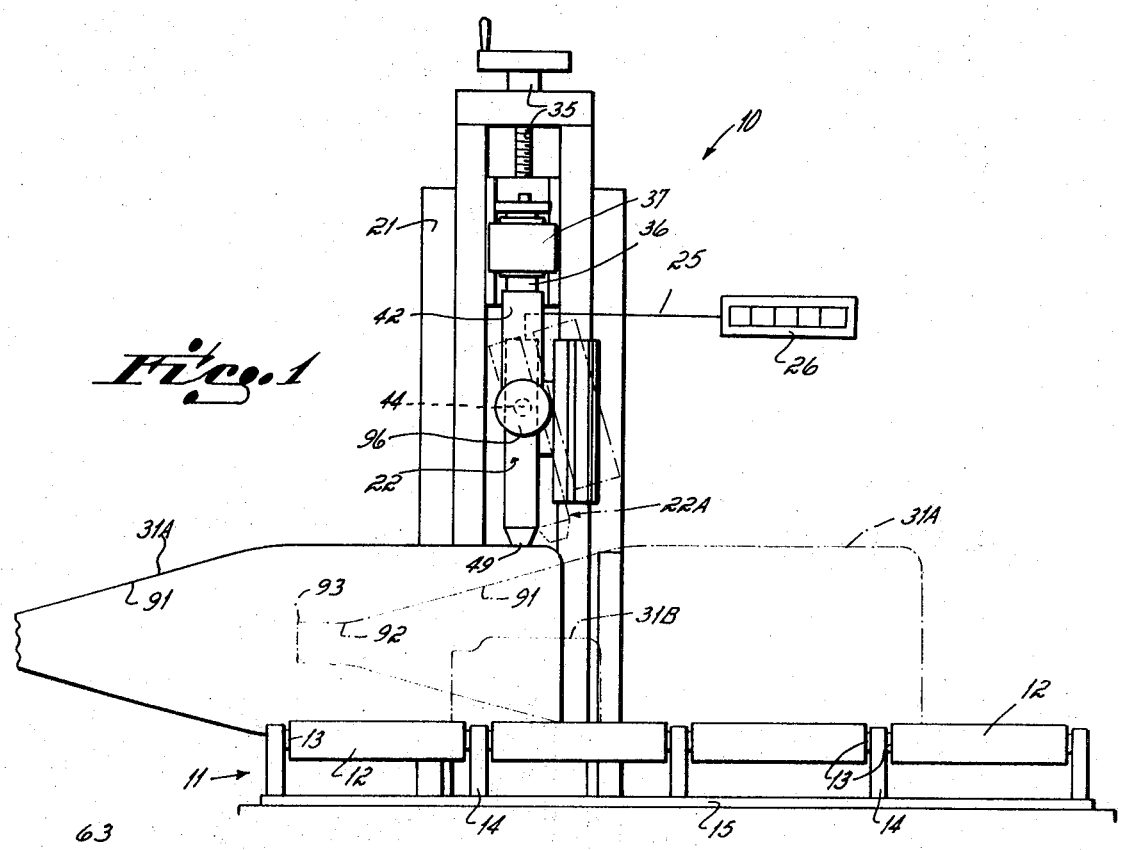
*Fig. 1*
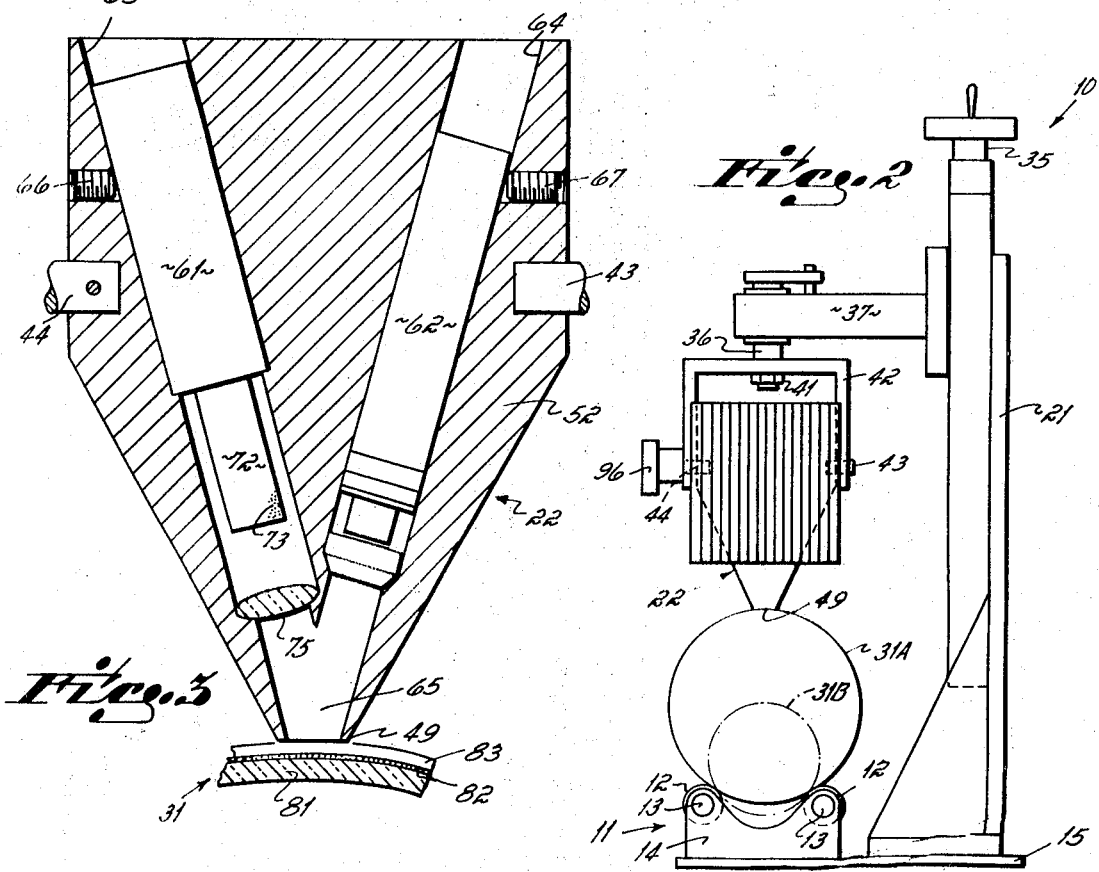
*Fig. 3*
*Fig. 2*

APPARATUS FOR MEASURING THE THICKNESS OF A METAL OXIDE COATING ON A GLASS ARTICLE

The present invention is directed to measurement apparatus for measuring metal oxide coatings on glass articles such as bottles and jars.

In the manufacture of glass bottles and jars, especially those used as containers for food and beverages, all or part of the surfaces of the articles are often purposely exposed to fumes of a metal compound such as stannic chloride or titanium tetrachloride, at elevated temperature. This treatment produces a desirable coating on the surface of the article. The resulting coatings are believed to be oxide forms of tin or titanium, and they are therefore referred to as metal oxides hereinafter, although possibly other compounds may also be present. Such coatings harden the external surface of the glass articles so that the articles can better resist the scratching and abrasion that arises in filling and/or handling. With articles such as returnable beverage bottles, baby food jars, etc., it is generally believed desirable to minimize scratching and abrasion.

In such treatments, the coating is deposited on the article as a very thin layer while the newly formed article is still hot. The vapor reacts with the surface of the glass to form the desired hardened glass surface to resist abrasion. Normally, the article is contacted with the vapor as the article passes through a coating tunnel at what is referred to as the "hot end" of the manufacturing line. Frequently an additional coating of a substance such as polyethylene is applied onto the articles thereafter, downstream at the "cold end" of the line. The present invention is concerned with measurement of the metal oxide coating whether or not it is covered with such a plastic overcoat. The metal oxide coating processes themselves are well known in the art, and comprise no part of the invention.

The oxide coatings are very thin—e.g., in the range of 10–100 microns. For optimum results, coating thickness must be precisely controlled within certain limits. A certain minimum thickness is necessary in order to provide the desired abrasion resistance; on the other hand, an excessively thick coating can result in an undesirable visual appearance, which in an extreme situation may give rise to an "oily" or iridized appearance. Moreover, an excessive coating wastes treating vapor.

The most widely used prior device for measuring the thickness of such metal oxide coatings is disclosed in the U.S. Pat. of Lyle et al., No. 3,397,609. That device requires the immersion of the article to be tested in a reservoir containing a liquid having an index of refraction which is the same as that of the glass. Most commonly the liquid used is monochlorobenzene. The thickness measurement is accomplished by directing a beam of light through the liquid onto the article and measuring the reflected light, again through the liquid. Apparatus of that type has certain disadvantages; among these are the inconvenience and time-consuming nature of the test, and the necessity of matching the index of refraction of the liquid with that of the article when articles of different glass compositions are to be tested. More importantly, the monochlorobenzene liquid is toxic, has a disagreeable odor, will stain clothing, and the necessary immersion of the article in it prevents subsequent use of the article. Hence, that device is unsuitable for on-line use.

A device using ultraviolet light has been proposed which does not require immersion of the article in a liquid to perform the test. That device is disclosed in U.S. Pat. No. 3,395,278 of McDivitt. However, it is a disadvantage of that device that, for accurate readings, it is necessary to focus the light properly and adjust the angles of incidence and reflection precisely, in order to receive the reflected beam properly. It is also necessary to turn the article to find and measure a point of maximum reflectivity on it. This limits utility of such devices for measuring the coating on "pebbled" or knurled areas. Also, in a device of the type proposed in the McDivitt patent, the intensity of the detected signal will vary in accordance with the size of the article, in that the spacings between source, detector, and article surface will depend upon the size of the article being tested, making calibration difficult and unreliable. A highly intense source is needed. Furthermore, ultraviolet radiation is harmful to the eyes of the operator and with the McDivitt arrangement protective measures are necessary to protect the operator.

It is a primary objective of the present invention to provide a more simple and reliable apparatus for testing the metal oxide coating on glass articles, and particularly by providing a convenient and reliable method which can utilize ultraviolet radiation to perform the measurement.

Accordingly, the present invention is predicated in part upon the providing of means for directing a beam of visible or ultraviolet radiation upon the surface of the glass article and detecting the reflected radiation to measure its magnitude, and to obtain therefrom a reading of the thickness of the glass article coating, which means are included in an integral head which maintains a fixed relationship of the source and detector in relation to a surface measurement position defined by the head. The present invention is further predicated in part upon providing means which allow for articles of varying sizes and shapes to be reliably tested to measure their coatings. Further, the present invention employs these concepts in an apparatus in such a way that the path of the radiation is shielded to protect the operator, the shield being defined by the structure of the head which mounts the source and detector.

The preferred embodiment of the invention provides apparatus for measuring the thickness of the metal oxide coating on the surface of a glass article which includes an ultraviolet light source and a detector contained in mounting structure which defines a reference plane at an opening in the structure. The light is directed from the source onto the plane at a fixed angle and received as reflected from the plane at substantially the same angle by the detector. The mounting structure defines spacing means which maintain the fixed relationship between the source and detector, and the reference plane so that the articles to be measured can be brought to this plane while establishing and maintaining this fixed relationship to the measurement components. An indicator responds to the signal from the detector to provide a readout which bears a relationship to the intensity of the reflected light to develop a numerical value corresponding to the coating thickness.

A visible light source may be used where the glass composition is opaque, and there is no reflection of light from the inner surface of the container wall. For clear containers, ultraviolet light is desirable; as is well known, glass is opaque to ultraviolet light, and hence there will be no reflection from the inside wall surface of the container. In either case, the interaction of the oxide layer with the impinging light is not critically dependant upon the wavelength of the light, and generally speaking, the thicker the layer, the greater the percent of incident light which will be reflected by it.

If the source is to be ultraviolet it preferably includes an emitter which emits at a major wavelength of about 2,537 angstrom units. This emitter is surrounded by a transparent envelope having deposited on it a phosphor which is excited by the emitted ultraviolet light, to reradiate ultraviolet light at a wavelength of approximately 2,950–3,000 angstrom units. This latter wavelength can be detected much more efficiently by available detectors than the 2,537 wavelength. The housing of the mounting structure forms a shielded path, of fixed length, for the light as it travels from the source to the plane and back to the detector. This housing is shaped to form an essentially circular aperture at the opening which establishes the reference plane. The fixed distance between the source and detector and the reference plane is relatively short, generally less than 2 inches. Measurements are made when this plane is brought into correspondence with the surface to be measured.

The light from the phosphor emitter is focused in this plane to increase the intensity of the incident beam. However, I have found that, surprisingly, by using an unfocused reflected beam, the device can accurately measure the coating thickness even on rough or "pebbled" or "knurled" areas of glass containers, and on the threads or ribs of finishes thereof. Measurement of these areas has been virtually impossible with past devices.

The structure preferably is further provided with glass article engaging means in the form of a pair of aligned rollers which position the articles to be measured. Associated with the engaging means is a movable support for mounting a head which contains the source and detector. The support provides a certain amount of free movability to allow the head to adjust to minor variations in measured article size, and further is provided with adjustable means for moving the head in relation to the engaging means to accommodate articles of greatly varying sizes. Furthermore, the head is mounted in such a manner that it can be angulated so that the reference plane can be brought into engagement with various inclined surfaces of the article so that the coatings on these portions can be measured. In the preferred embodiment, the head is mounted so as to be urged against the surface by gravity, but springs or other means may be used for this purpose.

The primary advantages of the present invention reside in the means for quickly and efficiently measuring articles of varying sizes and shapes without the need for delicate adjustment of the measurement apparatus. Furthermore, there is no need to immerse the articles to be measured in a dangerous or toxic liquid, while the unitary closure of the source and detector prevents the escape of harmful ultraviolet radiation which might be damaging to the eyes of the person operating the measuring equipment. Additionally, the fixed close-spaced article-head relationship is always accurately maintained so that precise relative readings can be obtained from the measurements and correlated with fixed standards of acceptability. The selection of wavelengths and the provision of the wavelength translating phosphor allow for the use of low energy and standard, easily obtainable source and detector units. Additionally, the present invention provides means for non-destructive testing in an arrangement which can be readily adapted to on-line use.

These and other objectives and advantages of the present invention will be more readily apparent from the following detailed description of the drawings, illustrating the preferred form of this apparatus for measuring metal oxide coatings on glass articles.

DETAILED DESCRIPTION OF THE DRAWINGS

FIG. 1 is an elevational view of a measurement apparatus embodying principles of the present invention.

FIG. 2 is a side view of the apparatus of FIG. 1.

FIG. 3 is an enlarged cross-sectional view of the measurement head of the apparatus of FIGS. 1 and 2.

Referring to FIG. 1, the measurement apparatus 10 includes bottle holding or engaging means 11 made up of parallel aligned sets of roller pairs 12 rotatably supported by bearings at 13 carried by brackets 14 mounted on a horizontal base 15. A support 21 upstanding vertically from the base 15 has mounted thereon a measurement head 22. The head 22 carries a light source and a detector which generates an analog electrical signal proportional to the thickness of a metal oxide coating on glass articles such as bottles and jars 31 when supported on the rollers 12. In the embodiment illustrated, the source is ultraviolet rather than visible, for use with transparent containers. The detector electrical signal is supplied through a lead 25 to an indicator 26 such as a digital volt meter which provides a digital readout of the thickness of the coating. The thickness readout may either be relative, or it may be calibrated in absolute values.

Referring to FIG. 2, the head 22, the vertical support 21, and the glass article engaging means 11 are illustrated in detail. In the engaging means 11, the spaced parallel sets of rollers 12 carried by the bearings 13 on the brackets 14 mounted to the base 15 are more clearly shown. Carried by the rollers 12, bottles 31 are illustrated showing the ability of the engaging means 11 to support bottles 31 of different sizes as illustrated by the large bottle 31A, shown in solid lines, and the small jar 31B, shown in phantom lines.

To accommodate for the bottles and jars 31 of different sizes, the vertical support 21 is provided with a screw slide 35 for making rough adjustments of the vertical position of the head 22 so that it may be positioned in engagement with the articles 31. On the other hand, small variations in article size are accommodated by a movable mounting means in the form of a limited motion vertically slidable shaft 36 carried by a bracket 37 extending horizontally from the carriage of the slide mechanism 35. Shaft 36 desirably travels in a ball bearing sleeve in bracket 37. The head 22 is suspended to the lower portion of the shaft 36 by suitable means such as a threaded nut 41 by way of a U-shaped bracket or yoke 42. The bracket 42 carries a pair of aligned shafts 43 and 44. Between the shafts is pivotally supported the head assembly 22. The lower tip 49 of the head assembly 22 defines a reference plane which is positionable against the surface of the article 31 to be measured.

The details of the head assembly 22 are more clearly shown in FIG. 3 wherein the cut-away housing 52 of the head assembly 22 is shown, carried by the pivot shafts 43 and 44 to support the head. The housing 52 has mounted internally thereof an ultraviolet light source 61, and a detector 62. The source and detector are mounted in angulated cylindrical bores 63 and 64, respectively, which intersect at an opening 65 at the lower tip 49 of the head 22. The bores 63 and 64 are inclined at substantially equal angles with respect to the plane of the opening 65. The housing 52 supports the source and detector 61 and 62, respectively, within the bores 63 and 64 so that they are maintained in a fixed spaced relationship to the opening 65. The source 61 and detector 62 are tightly secured within the bores 63 and 64 and made removable from the bores through the provision of adjustable set screws 66 and 67 within the bores 63 and 64, respectively.

A suitable ultraviolet light source 61 is a mercury-argon type ultraviolet generator as manufactured by Ultraviolet Products, Inc., San Gabriel, California under the trademark Pen-Ray. This source radiates energy with a major line having a wavelength of about 2,537 angstrom units. The radiation is directed from the source 61 through a quartz envelope 72. On the envelope 72 is deposited a coating 73 of a phosphor which is readily excitable by the 2,537 angstrom unit wavelength ultraviolet light, to re-radiate ultraviolet light having a strong wavelength band of about 2,950–3,000 angstrom units. Such phosphors are commercially available, and can be applied to the envelope in mixture with a clear epoxy cement. This re-radiated light passes through a lens 75 which focuses the ultraviolet light in the plane of the orifice 65.

The detector 62 is an ultraviolet sensitive photoelectric device, such as a Clairex Model 7UV 20–5 with a sapphire window. It detects the unfocused reflected ultraviolet light of the orifice 65. This particular detector is approximately four times as sensitive to the 2,950 angstrom unit wavelength light as it is to the 2,537 angstrom unit light. Thus, provision of the phosphor 73 on the envelope 72 to transform the frequency of the impinging light, results in greater detector sensitivity. Generally, the phosphor 73 will be found to have a photon efficiency of approximately 50 percent, so that the overall efficiency or sensitivity of the detector 62 is effectively increased by a factor of two by transforming the light through the use of the phosphor 73.

A typical measurement is performed on a glass article 31 which, in FIG. 3, is illustrated in section with a portion of its glass wall 81 shown On the wall is provided a metal oxide coating such as a titanium oxide or a tin oxide, in a minute thickness as shown in exaggerated scale at 82. Over the coating 82 there is often provided an additional coating of a plastic such a polyethylene. The latter coating, if present, does not affect the usability of the present apparatus. This coating is represented by the numeral 83.

The tester is used by first adjusting the vertical adjusting screw 35 to position the head 22 vertically to accommodate articles of the approximate size which are to be measured. Next, the article is positioned on the engaging rollers 12 and the head will slide vertically on the shaft 36 so that the surface 49 is firmly positioned against the surface of the article 31, so that the source 61 and detector 62 are maintained by the spacer configuration of the housing 52 a fixed distance from the surface at the orifice 65 to be measured.

In FIG. 1, the head 22 is shown measuring the coating on the cylindrical side wall portion of the article 31. Sometimes, it is desirable to measure the coating on the inclined side wall portion 91 or in the neck 92 or on the finish 93 regions. To provide this capability, the pivotally mounted head 22 can be tilted to the position shown by the phantom lines 22A so that the angled wall portions may be measured. The head 22 may be locked in place by a lock knob 96 provided on the shaft 44.

It will be seen from the above description that a greatly improved measurement apparatus is provided which overcomes many drawbacks of the prior art devices. Specifically, the preferred embodiment described provides a simple and reliable measurement apparatus for on-line or off-line use.

What is claimed is:

1. Apparatus for measuring the thickness of a metal oxide coating on the surface of a glass article comprising:
   a source of light;
   a detector responsive to the intensity of light impinging on it and for providing an output signal which corresponds to the intensity of the light detected;
   mounting structure for said source and said detector, for positioning said source, with respect to a reference plane, to direct a beam of light from said source at a fixed angle to the reference plane, for said detector to receive light from said beam reflected at substantially the same angle from the reference plane;
   spacer means connected to the mounting structure for contacting the surface of the glass article adjacent to the position thereon to be measured,
   said mounting structure so mounting the said source and detector for biasing them toward the article surface to be measured and for bringing said spacer means into physical contact with the surface of the article to be measured, so that the surface of the article at said position coincides with the reference plane; and
   an indicator responsive to the signal from the detector for providing a readout of the relative thickness of said coating.

2. The apparatus of claim 1 wherein:
   said source includes an emitter of ultraviolet light at a first wavelength and a phosphor for emitting ultraviolet light of a second wavelength when excited by light of said first wavelength, and said detector being more sensitive to light of said second wavelength than said first wavelength.

3. The apparatus according to claim 2 wherein:
   said first wavelength is about 2,537 angstrom units; and
   said second wavelength is about 2,950–3,000 angstrom units.

4. The apparatus according to claim 2 wherein said source includes:
   an envelope around said emitter;
   said phosphor being carried by said envelope.

5. The apparatus according to claim 1 further comprising:
   means forming a shielded path for said light from said source to said plane, and from said plane to said detector.

6. The apparatus of claim 1 wherein:
   the spacer means presents an enclosed circular aperture which establishes the reference plane; and
   the source is focused on the plane of said aperture.

7. The apparatus of claim 1 wherein the fixed distance is less than two inches.

8. The apparatus of claim 1 which includes a lens for focusing said beam from said source on said plane, but which includes no lens between said plane and said detector.

9. The apparatus of claim 1 wherein said source includes an emitter of ultraviolet light, and which further includes a filter for blocking light of wavelength greater than about 3,200 angstrom units from reaching said detector.

10. Apparatus for measuring the thickness of a metal oxide coating on the surface of a glass article comprising:
   means for engaging the side of a glass article, which side is opposite to the surface to be measured;
   a measurement head including:
   a. a source of light,
   b. a detector responsive to the intensity of light impinging on it and for providing an output signal which corresponds to the intensity of the light detected,
   c. mounting structure for said source and said detector, for positioning said source with respect to a reference plane, for directing a beam of light from said source at a fixed angle to the reference plane and for positioning said detector to receive light from said beam reflected at substantially the same angle from the reference plane, and
   d. spacer means connected to the mounting structure for contacting the surface of the glass article to be measured and for positively positioning said structure in such relation to the glass surface that the surface of the article coincides with the reference plane;
   a support for movably mounting said head with respect to said engaging means for urging said head toward said engaging means to hold the spacer means in contact with the surface to be measured, and the side of the article in engagement with said engaging means; and
   an indicator responsive to the signal from the detector for providing a readout of the relative thickness of said coating.

11. The apparatus of claim 10 which further includes adjustment means for adjusting the position of the mounting structure with respect to the engaging means.

12. The apparatus of claim 10 wherein:
   said engaging means includes a pair of spaced rollers for engaging a glass article at two spaced positions on the side wall of the article; and
   said head is tiltable on said support along a plane parallel to the axes of said rollers.

* * * * *